US011113092B2

United States Patent
Milne et al.

(10) Patent No.: US 11,113,092 B2
(45) Date of Patent: Sep. 7, 2021

(54) GLOBAL HRTF REPOSITORY

(71) Applicant: Sony Corporation, Tokyo (JP)

(72) Inventors: James R. Milne, Ramona, CA (US); Gregory Carlsson, Santee, CA (US); Tonni Sandager Larsen, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/424,313

(22) Filed: May 28, 2019

(65) Prior Publication Data

US 2020/0257548 A1 Aug. 13, 2020

Related U.S. Application Data

(60) Provisional application No. 62/803,147, filed on Feb. 8, 2019.

(51) Int. Cl.
*G06F 9/455* (2018.01)
*G06F 9/54* (2006.01)
(Continued)

(52) U.S. Cl.
CPC .......... *G06F 9/45558* (2013.01); *G06F 9/542* (2013.01); *G06F 9/547* (2013.01);
(Continued)

(58) Field of Classification Search
CPC ...... G06F 9/45558; G06F 9/542; G06F 9/547; G06F 2009/45583; G06F 2009/45595;
(Continued)

(56) References Cited

U.S. PATENT DOCUMENTS 6,181,800 B1  1/2001 Lambrecht
6,795,556 B1  9/2004 Sibbald et al.
(Continued)

FOREIGN PATENT DOCUMENTS

CN  105027580 B  5/2017
CN  107172566 B  1/2019
(Continued)

OTHER PUBLICATIONS

D. N. Zotkin, R. Duraiswami and L. S. Davis, "Rendering localized spatial audio in a virtual auditory space," in IEEE Transactions on Multimedia, vol. 6, No. 4, pp. 553-564, Aug. 2004, doi: 10.1109/TMM.2004.827516. (Year: 2004).*

(Continued)

*Primary Examiner* — James N Fiorillo
(74) *Attorney, Agent, or Firm* — John L. Rogitz

(57) ABSTRACT

A cloud-based HRTF repository system that can be accessed via a public application program interface (API) on the remote repository server to permit individual users of audio-capable client devices to upload and store personalized HRTFs and basic device data in an open format. The cloud server repository includes a computer readable non-volatile memory which further includes a program memory portion comprising an application program interface (API) module configured for receiving HRTF data from a client device, or from a brand manufacturer, and for sending HRTF data to a client device. A brand manufacturer can upload HRTF data to the cloud-based HRTF repository system either directly from their branded companion app in a client device, or optionally via their own cloud server. One technique includes using a Media Service Provider (MSP) app in the client device with a provided server access library (SAL) thereby enabling retrieval of HRTF data for bath a personalized HRTF for any brand client device, or for retrieval of (Continued)

generalized HRTF data by brand manufacturers having a SAL in their brand server via the remote server repository public API.

16 Claims, 7 Drawing Sheets

(51) Int. Cl.
*H04S 7/00* (2006.01)
*H04R 5/033* (2006.01)
*H04R 5/04* (2006.01)

(52) U.S. Cl.
CPC .............. *H04R 5/033* (2013.01); *H04R 5/04* (2013.01); *H04S 7/304* (2013.01); *G06F 2009/45583* (2013.01); *G06F 2009/45595* (2013.01); *H04S 2420/01* (2013.01)

(58) Field of Classification Search
CPC . G06F 9/54; G06F 9/455; H04L 67/06; H04L 67/10; H04L 67/104; H04L 67/306; H04S 7/301; H04S 7/304; H04S 2420/01; H04S 7/00; H04R 5/04; H04R 5/033; H04R 1/10; H03F 3/68
USPC .............. 709/217, 219, 217.219; 381/17, 307
See application file for complete search history.

(56) References Cited

U.S. PATENT DOCUMENTS

| | | | |
|---|---|---|---|
| 7,634,092 B2 | 12/2009 | McGrath | |
| 7,720,229 B2 | 5/2010 | Duraiswami et al. | |
| 7,840,019 B2 | 11/2010 | Slaney et al. | |
| 8,452,036 B2 | 5/2013 | Sommer et al. | |
| 8,489,371 B2 | 7/2013 | Guillon et al. | |
| 8,503,682 B2 | 8/2013 | Fukui et al. | |
| 8,520,857 B2 | 8/2013 | Fukui et al. | |
| 8,787,584 B2 | 7/2014 | Nyström et al. | |
| 9,030,545 B2 | 5/2015 | Pedersen | |
| 9,101,279 B2 | 8/2015 | Ritchey et al. | |
| 9,118,488 B2 | 8/2015 | Donaldson | |
| 9,118,991 B2 | 8/2015 | Nystrom et al. | |
| 9,167,368 B2 | 10/2015 | Jong et al. | |
| 9,448,405 B2 | 9/2016 | Yamamoto | |
| 9,544,706 B1* | 1/2017 | Hirst | H04S 7/302 |
| 9,591,427 B1* | 3/2017 | Lyren | H04S 7/301 |
| 9,740,305 B2 | 8/2017 | Kabasawa et al. | |
| 9,848,273 B1 | 12/2017 | Helwani et al. | |
| 9,854,362 B1 | 12/2017 | Milne et al. | |
| 9,900,722 B2 | 2/2018 | Bilinski et al. | |
| 9,924,289 B2* | 3/2018 | Trivi | H04S 7/30 |
| 9,992,602 B1* | 6/2018 | Allen | H04S 3/004 |
| 10,003,905 B1 | 6/2018 | Milne et al. | |
| 10,149,089 B1* | 12/2018 | Edry | H04S 7/303 |
| 10,154,365 B2 | 12/2018 | Silva | |
| 10,206,055 B1 | 2/2019 | Mindlin et al. | |
| 10,455,327 B2* | 10/2019 | Oswald | H04R 5/027 |
| 10,492,018 B1 | 11/2019 | Allen | |
| 10,499,179 B1 | 12/2019 | Lyren | |
| 2004/0091119 A1 | 5/2004 | Duraiswami et al. | |
| 2006/0116930 A1 | 6/2006 | Goldstein | |
| 2006/0282671 A1 | 12/2006 | Burton | |
| 2011/0137437 A1* | 6/2011 | Jonsson | G10L 15/26 700/94 |
| 2011/0314530 A1 | 12/2011 | Donaldson | |
| 2012/0014528 A1* | 1/2012 | Wang | H04S 1/005 381/17 |
| 2012/0201405 A1* | 8/2012 | Slamka | H04S 7/306 381/307 |
| 2013/0036452 A1 | 2/2013 | Yamashita | |
| 2013/0154930 A1* | 6/2013 | Xiang | G06F 3/167 345/158 |
| 2013/0169779 A1* | 7/2013 | Pedersen | G06K 9/00362 348/77 |
| 2013/0170679 A1 | 7/2013 | Nystrom et al. | |
| 2013/0177166 A1 | 7/2013 | Agevik et al. | |
| 2013/0208899 A1* | 8/2013 | Vincent | A63F 13/428 381/17 |
| 2014/0171195 A1* | 6/2014 | Searchfield | A63F 13/79 463/31 |
| 2014/0185847 A1 | 7/2014 | Gran et al. | |
| 2015/0010160 A1 | 1/2015 | Udesen | |
| 2015/0063610 A1* | 3/2015 | Mossner | H04S 5/005 381/307 |
| 2015/0106475 A1* | 4/2015 | Tan | H04S 5/005 709/217 |
| 2015/0256613 A1* | 9/2015 | Walker | H04L 43/087 709/217 |
| 2015/0293655 A1 | 10/2015 | Tan | |
| 2015/0347735 A1 | 12/2015 | Yamashita | |
| 2016/0100268 A1* | 4/2016 | Stein | H04R 5/00 381/17 |
| 2016/0124707 A1* | 5/2016 | Ermilov | G06F 9/451 345/156 |
| 2016/0142848 A1* | 5/2016 | Saltwell | H04S 1/002 381/17 |
| 2016/0269849 A1* | 9/2016 | Riggs | H04S 7/301 |
| 2017/0078820 A1 | 3/2017 | Brandenburg et al. | |
| 2017/0094440 A1* | 3/2017 | Brown | H04S 7/30 |
| 2017/0332186 A1* | 11/2017 | Riggs | H04R 5/033 |
| 2018/0091921 A1 | 3/2018 | Silva | |
| 2018/0136898 A1 | 5/2018 | Shi et al. | |
| 2018/0139565 A1* | 5/2018 | Norris | H04S 1/007 |
| 2018/0249276 A1* | 8/2018 | Godfrey | G11B 27/10 |
| 2018/0310115 A1 | 10/2018 | Romigh | |
| 2019/0007725 A1* | 1/2019 | Ferrer | H04N 21/42202 |
| 2019/0200159 A1 | 6/2019 | Park et al. | |
| 2019/0215637 A1 | 7/2019 | Lee et al. | |
| 2020/0045491 A1 | 2/2020 | Robinson et al. | |
| 2020/0077222 A1* | 3/2020 | Nguyen | H04R 5/033 |
| 2020/0104620 A1* | 4/2020 | Cohen | G06K 9/00221 |
| 2020/0107149 A1* | 4/2020 | Sunder | H04R 1/406 |
| 2020/0260199 A1* | 8/2020 | Burwinkel | H04R 27/00 |
| 2021/0185471 A1* | 6/2021 | Jot | H04S 7/304 |

FOREIGN PATENT DOCUMENTS

| | | |
|---|---|---|
| JP | 5285626 B2 | 9/2013 |
| JP | 2017092732 A | 5/2017 |
| WO | 2017116308 A1 | 7/2017 |
| WO | 2018110269 A1 | 6/2018 |
| WO | 2019059558 A1 | 3/2019 |

OTHER PUBLICATIONS

Mohapatra et al., "Generating Personalized End User Head-Related Transfer Function (HRTF) from Generic HRTF", related U.S. Appl. No. 16/662,995, Non-Final Office Action dated Apr. 29, 2020.
Mohapatra et al., "Generating Personalized End User Head-Related Transfer Function (HRTF) from Generic HRTF", related U.S. Appl. No. 16/662,995, Applicant's response to Non-Final Office Action filed May 5, 2020.
Politis et al., "Applications of 3D spherical transforms to personalization of head-related transfer functions", 2016 IEEE International Conference on Acoustics, Speech and Signal Processing (ICASSP), Mar. 2016.
"Hear an Entirely New Dimension of Sound", OSSIC, Retrieved from https://www.ossic.com/3d-audio/.
Dmitry N. Zotkin, Jane Hwang, Ramani Duraiswami, Larry S. Davis, "HRTF Personalization Using Anthropometric Measurements", Perceptual Interfaces and Reality Laboratory Institute for Advanced Computer Studies (UMIACS), University of Maryland (2003).
Henrik Moller, "Fundamentals of Binaural Technology", Acoustics Laboratory, Aalborg University, Mar. 3, 1992, Aalborg, Denmark.
James R. Milne, Gregory Carlsson, Tonni Sandager Larsen, "Head Related Transfer Function (HRTF) as Biometric Authentication", file history of related U.S. Appl. No. 16/440,288, filed Jun. 13, 2019.

(56) References Cited

OTHER PUBLICATIONS

James R. Milne, Gregory Peter Carlsson, "Generating Personalized End User Head-Related Transfer Function (HRTF) Using Panoramic Images of Ear", file history of related U.S. Appl. No. 16/168,317, filed Oct. 23, 2018.
James R. Milne, Gregory Peter Carlsson, "Techniques Combining Plural Head-Related Transfer Function (HRTF) Spheres to Place Audio Objects", file history of related U.S. Appl. No. 16/424,983, filed May 29, 2019.
Slim Ghorbal, Renaud Seguier, Xavier Bonjour, "Process of HRTF Individualization by 3D Stastical Ear", Audio Engineering Society, Convention e-Brief 283, Presented at the 141st Convention, Sep. 29-Oct. 2, 2016, Los Angeles, CA.
Sridhar et al., "A Database of Head-Related Transfer Function and Morphological Measurements", Audio Engineering Society, Oct. 2017, New York.
Sylvia Sima, "HRTF Measurements and Filter Designs for a Headphone-Based 3D-Audio System", Faculty of Engineering and Computer Science, Department of Computer Science, University of Applied Sciences, Hamburg, Germany, Sep. 6, 2008.
Thibaut Carpentier. "Binaural synthesis with the Web Audio API". 1st Web Audio Conference (WAC), Jan. 2015, Paris, France. hal-01247528.
Farina et al., "Measuring Spatial MIMO Impulse Responses in Rooms Employing Spherical Transducer Array", AES, 2016.
Milne et al., "Techniques Combining Plural Head-Related Transfer Function (HRTF) Spheres to Place Audio Objects", related U.S. Appl. No. 16/424,983, Non-Final Office Action dated May 15, 2020.
Milne et al., "Techniques Combining Plural Head-Related Transfer Function (HRTF) Spheres to Place Audio Objects", related U.S. Appl. No. 16/424,983, Applicant's response to Non-Final Office Action filed May 27, 2020.
Milne et al., "Generating Personalized End User Room-Related Transfer Function (RRTF)", file history of related U.S. Appl. No. 16/681,632, filed Nov. 12, 2019.
Yarra 3DX: The Most Advanced 3D Audio System in the World, Jul. 2016, retrieved from https://www.kickstarter.com/projects/yarra3dx/yarra-3dx-the-most-advanced-3d-audio-system-in-the.
Milne et al., "Generating Personalized End User Head-Related Transfer Function (HRTF) from Generic HRTF", file history of related U.S. Appl. No. 16/662,995, filed Oct. 24, 2019.
James R. Milne, Gregory Peter Carlsson, "Generating Personalized End User Head-Related Transfer Function (HRTF) Using Panoramic Images of Ear", related U.S. Appl. No. 16/168,317, Non-Final Office Action dated Aug. 4, 2020.
James R. Milne, Gregory Peter Carlsson, "Generating Personalized End User Head-Related Transfer Function (HRTF) Using Panoramic Images of Ear", related U.S. Appl. No. 16/168,317, Applicant's response to Non-Final Office Action dated Sep. 17, 2020.
Milne et al., "Techniques Combining Plural Head-Related Transfer Function (HRTF) Spheres to Place Audio Objects", related U.S. Appl. No. 16/424,983, Final Office Action dated Sep. 18, 2020.
Mohapatra et al., "Generating Personalized End User Head-Related Transfer Function (HRTF) from Generic HRTF", related U.S. Appl. No. 16/662,995, Non-Final Office Action dated Jul. 31, 2020.
Mohapatra et al., "Generating Personalized End User Head-Related Transfer Function (HRTF) from Generic HRTF", related U.S. Appl. No. 16/662,995, Applicant's response to Non-Final Office Action filed Sep. 15, 2020.
Milne et al., "Techniques Combining Plural Head-Related Transfer Function (HRTF) Spheres to Place Audio Objects", related U.S. Appl. No. 16/424,983, Applicant's response to Final Office Action filed Nov. 10, 2020.
Mohapatra et al., "Generating Personalized End User Head-Related Transfer Function (HRTF) from Generic HRTF", related U.S. Appl. No. 16/662,995, Final Office Action dated Sep. 29, 2020.
Mohapatra et al., "Generating Personalized End User Head-Related Transfer Function (HRTF) from Generic HRTF", related U.S. Appl. No. 16/662,995, Applicant's response to Final Office Action filed Oct. 27, 2020.
Thesaurus, Deviation Synonyms, Deviation Antonyms, (Year:2011).
James R. Milne, Gregory Carlsson, Tonni Sandager Larsen, "Head Related Transfer Function (HRTF) as Biometric Authentication",related U.S. Appl. No. 16/440,288, Non-Final Office Action dated Mar. 17, 2021.
James R. Milne, Gregory Carlsson, Tonni Sandager Larsen, "Head Related Transfer Function (HRTF) as Biometric Authentication",related U.S. Appl. No. 16/440,288, Applicant's response to Non-Final Office Action filed May 5, 2021.
Sonada et al., "User Authentication Scheme Using Individual Auditory Pop-Out", New Directions in Intelligent Interactive Multimedia. Studies in Computational Intelligence, vol. 142. Berlin, Heidelberg, 2008.
Milne et al., "Generating Personalized End User Room-Related Transfer Function (RRTF)", related U.S. Appl. No. 16/681,632, Non-Final Office Action dated Jan. 11, 2021.
Milne et al., "Generating Personalized End User Room-Related Transfer Function (RRTF)", related U.S. Appl. No. 16/681,632,Applicant's response to Non-Final Office Action filed Jan. 29, 2021.
Mohapatra et al., "Generating Personalized End User Head-Related Transfer Function (HRTF) from Generic HRTF", related U.S. Appl. No. 16/662,995, Non-Final Office Action dated Jan. 21, 2021.
Mohapatra et al., "Generating Personalized End User Head-Related Transfer Function (HRTF) from Generic HRTF", related U.S. Appl. No. 16/662,995, Applicant's response to Non-Final Office Action filed Feb. 1, 2021.

* cited by examiner

Mode Select

User ID: __XYZ__
Brand: __ABC__   } 61
Device: __DEF__

Mode:
- Upload ☐
- Download ☐
- Edit List ☐
- Exit ☐

Download User Interface

User ID: __XYZ__
Brand: __ABC__
Device: __DEF__

Select One          Default

User HRTFs
- _____ ☐
62 → * ・ _____ ☐

General
- _____ ☐

[Download selected]   [Exit]

FIG. 3B

Upload User Interface

User ID: __XYZ__
Brand: __ABC__
Device: __DEF__

Local HRTFs
1. HRTF X ☐
2. HRTF Y ☐
3. HRTF Z ☐
4. HRTF T ☐

[Upload selected]   [Exit]

FIG. 3C

Virtualization

☐ C    ☐ CH   ☐ CB
☐ LF   ☐ LFH  ☐ LFB
☐ RF   ☐ RFH  ☐ RFB
☐ LS   ☐ LSH
☐ RS   ☐ RSH
☐ LFE

☐ All Channels

GLOBAL HRTF REPOSITORY

FIELD

The present application relates generally to storing, sharing, and processing of head-related transfer functions (HRTF).

BACKGROUND

Humans estimate the location of a source by taking cues derived from one ear and by comparing cues received at both ears. Among the difference cues are time differences of arrival and intensity differences. The monaural cues come from the interaction between the sound source and the human anatomy, in which the original source sound is modified before it enters the ear canal for processing by the auditory system. These modifications encode the source location and may be captured via an impulse response which relates the source location and the ear location. This impulse response is termed a Finite Impulse Response (FIR) or alternately the head-related impulse response (HRIR). Convolution of an arbitrary source sound with the HRIR converts the sound to that which would have been heard by the listener if it had been played at the source location, with the listener's ear at the receiver location.

Because of diffraction and interference, the outer ear produces a directionality dependent filter process of incoming soundwaves. This action is described by the Head Related Transfer Function (HRTF). The HRTF describes how an acoustic signal is filtered by the reflection properties of the head, shoulders and most notably the pinna before the sound reaches the ear drum. From the HRTF localization cues can be extracted. The HRTF is the Fourier transform of an HRIR, and they completely and uniquely capture all linear properties of the sound transmission and contain all proposed descriptors of localization cues.

An accurate HRTF is unique to each individual, as well as the brand and model of the audio play back device. Variations in headphone response, and audio circuit playback latencies may affect the virtualization ability and quality of a generic HRTF. Even when measured for a "dummy head" of idealized geometry, HRTFs are complicated functions of frequency and three spatial variables (the radial distance, azimuthal angle, and polar angle). An accurate, personalized HRTF containing pinna and other anthropometric cues are personal to each user and difficult to measure.

SUMMARY

As understood herein, HRTF virtualization of an audio signal is dependent upon many factors including multiple spatial variables, reflection and diffraction by the head and torso, and equipment variables such as type/brand of audio reproduction equipment, headphone quality, and associated latencies. The creation of an HRTF is costly, and time consuming due to the amount of equipment required, and because the HRTF is a frequency response function of the ear, an accurate HRTF may be unique for each individual. Accordingly, it would be desirable to save the HRTF data associated with a personalized custom HRTF that captures the anthropometric variables associated with an individual including the reflection properties of the head, shoulders and most notably the pinna before the sound reaches the ear, and the outer ear transfer function. A generalized set of HRTFs as provided by brand manufacturers of client devices may be sufficient for the generation of three-dimensional sound for devices belonging to that manufacturers brand, and if combined with the user specific anthropometric HRTF all location cues may be derived including spatial, and anthropometric cues.

It is desirable to create a repository for storing individualized HRTFs, as well as generalized manufacture brand HRTFs. Accordingly, systems and techniques are described to facilitate storing and retrieval of personalized HRTFs as well as generalized HRTFs, sufficient to provide a desired level of virtualization to an audio signal.

A cloud-based HRTF repository system is described that can be accessed via a public application program interface (API) on a remote repository server to permit individual users of audio-capable client devices to store personalized HRTFs and basic device data in an open format. Moreover, any brand manufacturer can upload data to the cloud-based HRTF repository system either directly from their branded companion app on a client device, or optionally via their own cloud server. One technique includes using a brand companion app specific to a brand of headphone/listening device in a client device provided with a server access library (SAL) thereby enabling uploading of HRTF data for both the personalized HRTF for any brand client device, or for the retrieval of HRTF data via a media service provider (MSP) app in the client device.

The cloud server repository of one embodiment includes a computer readable non-volatile memory which further includes a program memory portion comprising a public application program interface (API) module configured for receiving and storing HRTF data from a client device, or brand manufacturer, and for retrieval and sending HRTF data to a client device. Initiation of the client device MSP app may also initiate or launch a companion app; the companion app being associated with a brand of headphone/listening device. Alternately, the companion app may be manually launched by the user. The companion app causes a local processer to send user validation data, including user identification and device information to the cloud server API whereupon access to the stored HRTF data would be granted if the user and client device information is validated. If validation is not successful, then registration of the user and the client device brand, and optionally the device model number would be requested of the user in order to enable indexing of the uploaded HRTF data by the cloud server repository. The client validation data is stored in a portion of the remote repository memory. A second data memory portion comprises (HTRF) data sorted according to the client validation data. Once user has been validated, the cloud server repository then sends a transfer mode selection prompt to the client device.

Further to this embodiment, upon successfully validating a user, a user interface (UI) is presented to the user of the client device to enable a transfer mode selection, the transfer mode selection UI comprising a prompt for the user of the client device to select a data transfer option including but not limited to one of retrieve HRTF data, upload HRTF data, and cancel the transaction. The companion app may generate and animate the UI panel template, or alternately, the UI template may be generated by the cloud server and sent to the client device as an animation. The user then selects whether an HRTF upload, a HRTF download, or transaction cancelation is desired and sends the selection to the remote server repository. The user transfer mode selection data is received by the server repository through the public API.

Responsive to the remote server repository receiving transfer mode selection data requesting upload of a client HRTF, the remote server repository transmits an HRTF upload UI to the client device to allow client selection of local HRTF data to be uploaded to the API. If the selected mode is to download HRTF data from the remote server repository, the client app displays a UI that lists available HRTFs stored in the second data memory portion in accordance with the client validation data. Where a manufacturer wishes to upload a generalized HRTF for its brand to the remote server repository, the second data memory portion further comprises a manufacturer HRTF data portion wherein HRTF data is provided by device brand manufacturer and is indexed by manufacturer brand identifiers. In an alternate embodiment, the companion app may generate and animate the UI upload/download panel template.

Another aspect of the remote HRTF repository system includes animating on a client display user interfaces (UI) for sending and receiving the data associated with storing and retrieving of HRTF data to and from the remote server HRTF repository. An initial UI may be provided to the client for display to indicate successful validation of user data by the remote server API. An additional transfer mode UI may be provided to the client device for display prompting the user to select whether user HRTF data is to be uploaded or downloaded, or if a generalized brand manufacturer HRTF is to be downloaded. This UI is followed by a subsequent UI provided to the client device for display prompting the user to indicate which local HRTF is desired to be uploaded, or which HRTF stored in the remote server HRTF repository is to be downloaded. User selection of a virtualization mode can be made by causing the remote server repository API to send a virtualization mode selection UI to the client device prompting the user of the client device to select a desired virtual audio mode to be generated by an HRTF decoding and convolution program. In one embodiment, the HRTF decoding and convolution processes are performed in the client device. In this embodiment the resulting location cues needed for selected virtualization mode are summed in a client application program in accordance with that selected mode. In another embodiment, the resulting rendered location cues can be summed on the remote server in accordance with a virtualization mode selected via the virtualization mode UI.

In another embodiment, the remote repository server may include a data linked API (DL API). In this embodiment, the manufacturer data portion comprises manufacturer validation data including at least a URL address of the brand manufacturers cloud server API to be used by the DL API. In this embodiment, if a generalized brand HRTF is requested by the user, the DL API retrieves the brand manufacturer-provided generalized HRTF directly from the brand manufacturer server and sends it to the repository server. The repository server may then forward the retrieved HRTFs for that brand to the user responsive to the user's download request for a brand manufacturer's generalized HRTF. In one aspect of this embodiment, the generalized brand HRTF is used to derive the general localization cues appropriate for the device brand. In another aspect of this embodiment, the decoded generalized brand HRTF is combined with the decoded user specific HRTF to include pinna and inner ear anthropometric related transfer functions thus providing a much more personalized virtualization.

In yet another embodiment, decoding of the HRTF, convolution of the HRIR with an audio signal, and virtualization is performed by the remote repository server. In one aspect of this embodiment, the MSP URL and audio selection criteria are communicated by the client app to the remote server data linked public API. The remote server data linked API then downloads the audio from the designated audio source consistent with the audio selection criteria. The audio is then convoluted with the HRIR, and the resulting individual audio streams are then summed to provide a virtualized audio including desired localization cues in accordance with a selected virtualization level. In one aspect of this embodiment the virtualized audio is then sent to the user device. In another aspect of this embodiment the virtualized audio is registered to a video stream, thus replacing the original audio in a streaming video or computer game.

In yet a further embodiment, an MSP remote server includes streaming audio content, A/V content, and gaining content which may be selected by a user/subscriber of this content. The selected content is then communicated to the HRTF remote repository server where the audio content be processed entirely by the remote repository server. More particularly, the audio portion of A/V content, or gaming content can be extracted, convoluted with a selected rendered HRTF, virtualized in accordance with the location cues selected by the user, and finally re-synchronized with its associated video stream. The HRTF remote repository then streams the resulting virtualized A/V stream to the user device;

BRIEF DESCRIPTION OF THE DRAWING(S)

FIG. 3A-3D are example user interfaces consistent with present principles of the present invention.

DETAILED DESCRIPTION

Figure 1:
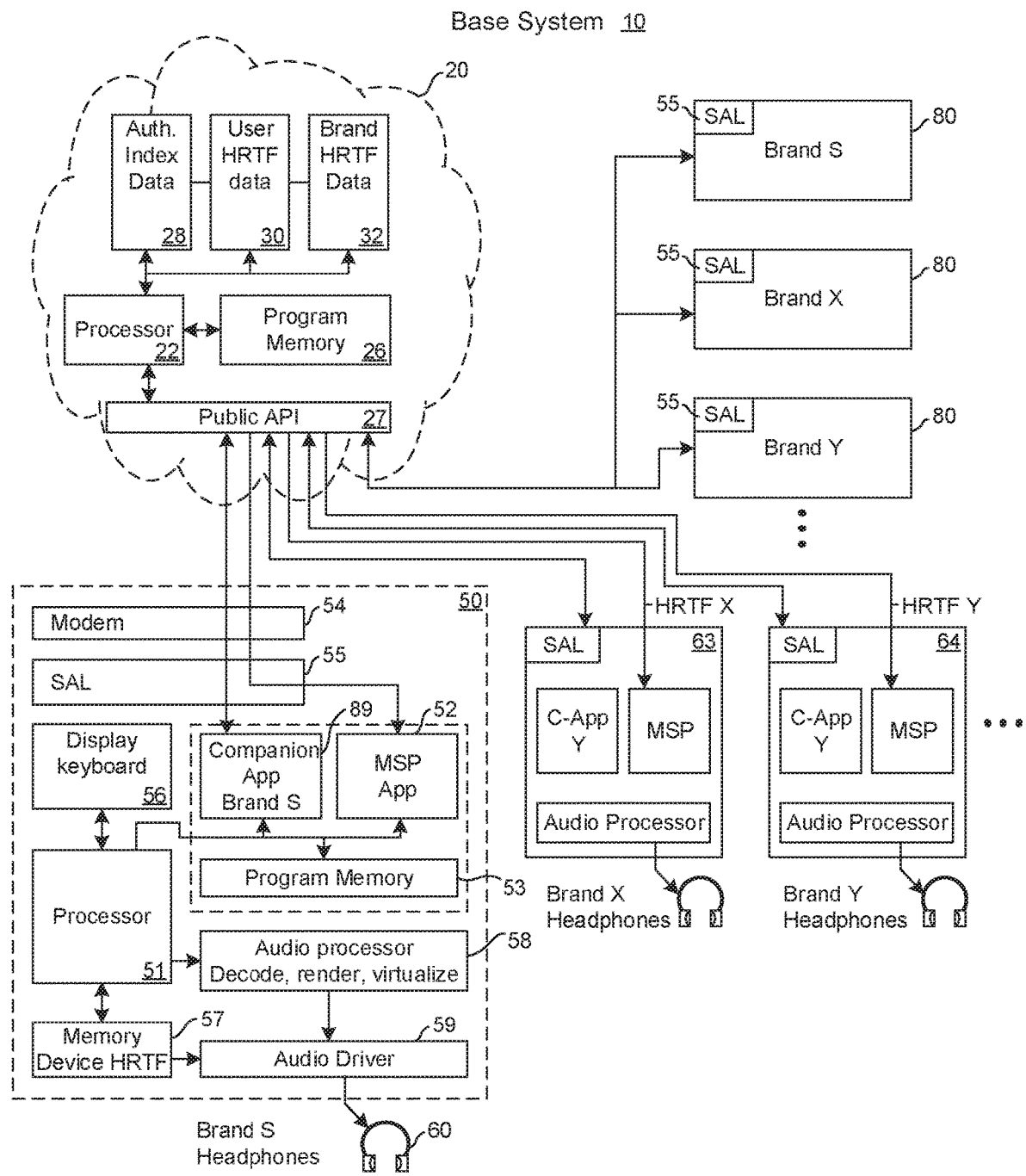
FIG. 1 is a block diagram of an example networked HRTF repository system.

All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls.

U.S. Pat. No. 9,854,362 is incorporated herein by reference and describes details of finite impulse response (FIR) filters mentioned below. U.S. Pat. No. 10,003,905, incorporated herein by reference, describes techniques for generating head related transfer functions (HRTF) using microphones. U.S. Pat. No. 8,503,682, owned by the present assignee and incorporated herein by reference, describes a method for convoluting HRTF onto audio signals. US20120183161A1, owned by the present assignee and incorporated herein by reference, describes capturing images of one or more body parts of a user via a camera, determining a three-dimensional model of the one or more body parts based on the captured images, and obtaining a head-related anthropometric HRTF that is generated based on the three-dimensional model.

This disclosure accordingly relates generally to computer ecosystems including aspects of virtualized audio reproduction. A system herein may include server and client components, connected over a network such that data may be exchanged between the client and server components. The client components may include one or more computing devices that are configured to communicate audio signals to electroacoustic transducers including headphones, wireless speakers via an appropriate wireless transmission system, and audio speakers including audio speaker assemblies per se but also including speaker-bearing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

A client device may include an integrated display or be configured to connect to a display. The client device may include or be configurable to include data entry means including but not limited to a keyboard, keypad, mouse, touchscreen, voice commands, gesture recognition, and virtual keyboards, and a local memory including data memory and program memory, the memory to include connection to a wired or wireless local server, the local server having network access.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online subscription services and data sharing to network members.

As used herein, program memory refers to a computer readable tangible memory portion containing instructions referring to computer-implemented steps for managing data flow, sorting and storing data, and processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

A Media Service Provider (MSP) is an organization that complements its regular business by including a set of media services such as online gaming, music and video and other streaming media. Examples include Sony's PlayStation Now®, Sony Online Entertainment®, Amazon Music®, Amazon Prime®, Netflix®, iTunes®, Pandora®, HULU®, and the like. Each MSP may have an app that can be downloaded and installed on a user device such as a computer tablet, or mobile cellular smartphone to provide immediate network access to the MSP. Media Services relevant to this invention include media having an audio component. Any communication between the MSP app and the public API in the HRTF remote repository must be made via an embedded server access library (SAL).

A Companion App is software specific to a brand manufacturer and is used for setting up and configuring the related brand's headphone/listening devices. The Companion App of this invention includes executable command causing a processor to upload HRTF data to the Global HRTF repository of this invention via an embedded server access library (SAL) and to enable a user to select which of the uploaded HRTF datasets should be used.

A device/user identifier used to validate, index, and associate a stored HRTF with a device includes any unique identifier including but not limited to unique attributes of the client device such as a phone ID, MAC address, serial number, and the like. In addition, biometric data may be used to provide a unique identifier including either alone of in combination a fingerprint scan, retinal scan, voice recognition, face recognition, and the like.

User interfaces (UI) may include any interface between a user and a component of the system for communicating information to the user, or for prompting user instruction necessary for further processing by the system. The UI may be presented visually on a display as an animation including but not limited to a data input panel, an option selection panel, a progress panel, status information, and the like. Interaction with the UI may be accomplished by keypad, cursor pointing devices, verbal, hand gestures, eye tracking, and the like. The companion app may generate and animate the UI panel template locally in the client device, or alternately, the UI template may be generated by the cloud server and sent to the client device as an animation.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments. "A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1 a remote HRTF repository system 10 is shown including a remote repository server 20, consumer electronic user devices 50, 63, and 64, and brand manufacturer servers 80. Individual user specific HRTF data may be uploaded from the client device 50 using a companion app 89 via embedded SAL 55. Additionally, generalized brand manufacturer HRTF data may be uploaded directly from the companion app 89 via the embedded SAL 55, or alternately, directly from their own brand cloud servers 80. In this embodiment the brand cloud server will communicate with the HRTF remote repository via that cloud server's embedded SAL 55. Any app, including the companion app 89, MSP app 52, and brand cloud servers 80 must integrate the SAL into their app in order to access the HRTF cloud server.

In one embodiment, remote repository server 20 comprises at least one processor 22, at least one computer readable non-transitory medium 24 comprising a program memory 26 containing executable instructions to cause the processor to conduct HRTF transfer and storage transactions, and data memory portions for storing user validation data 28, user uploaded HRTFs 30, and generalized brand HRTF data 32. The validation memory 28 may key off a unique user/device identifier, for example a phone ID associated with a mobile phone client device. Other unique identifiers such as biometric information may also be used alone or in combination with the unique phone I.D. User data memory portion 30 includes user specific HRTFs and any labels that permit further sorting of the HRTF data such as user client device brand and model. Other labels may include the type, brand, and model of headphone or speaker to be used for virtualized audio output. The data memory 30 may support a plurality of data sets such that a user is able to upload and store multiple profiles. In the event of multiple user HRTF data sets, a user may designate/select the currently active HRTF data set to be used the MSP app 52. By way of example and not be limitation, the data structure in user data memory may be configured as follows:

Phone ID
  Active Profile
  Profile Name
    Device Name
    HRTF Data
  Profile Name
    Device Name
    HRTF Data
  Profile Name
    Device Name
    HRTF A public application interface (API) 27 enables public access to the remote HRTF repository to permit validation, HRTF uploading functionality via a companion app 89, or from brand servers 80. The public API 27 also enables HRTF downloading functionality to an MSP app 52 in a program memory 53 of the user device. Interaction of the companion app 89 with the HRTF cloud server may be limited to the commands available from a server access library (SAL) 55 located in each user device 50, 63, and 64 and brand manufacturer server 80. The SAL provides a command structure to enable a user to retrieve any brand HRTF which has used the public API 27 to upload generalized and personalized HRTF data to the remote repository server.

User device 50 in FIG. 1 is a consumer electronic device including at least one processor 51 which may include a graphics processor configured to display a user interface on a display 56, a network modem 54, a UI for entering data, a server access library 55, at least one computer readable non-transitory medium 57 containing local HRTF data and device data, and executable instructions to cause the processor to upload and download user personalized HRTF data, as well as download brand generalized HRTF data. Computer readable medium further includes an MSP application executable instructions 52 to cause the processor to negotiate data transfer between the client device and remote the repository server. In one embodiment the executable instructions may cause the processor to decode and render an audio object media signal such as MPEG H media. In another embodiment the executable instructions may also cause the processor to process HRTF data. Such processing instructions 58 may include decoding HRTF data, convoluting the resulting head related impulse function with audio data to provide the individual location cues associated with a desired virtualization, and then summing the individual location audio streams to output a virtualized audio stream to an audio driver 59. The virtualized audio is then directed to an audio playback transducer such as headphones 60, speakers, and the like.

Figure 2A:
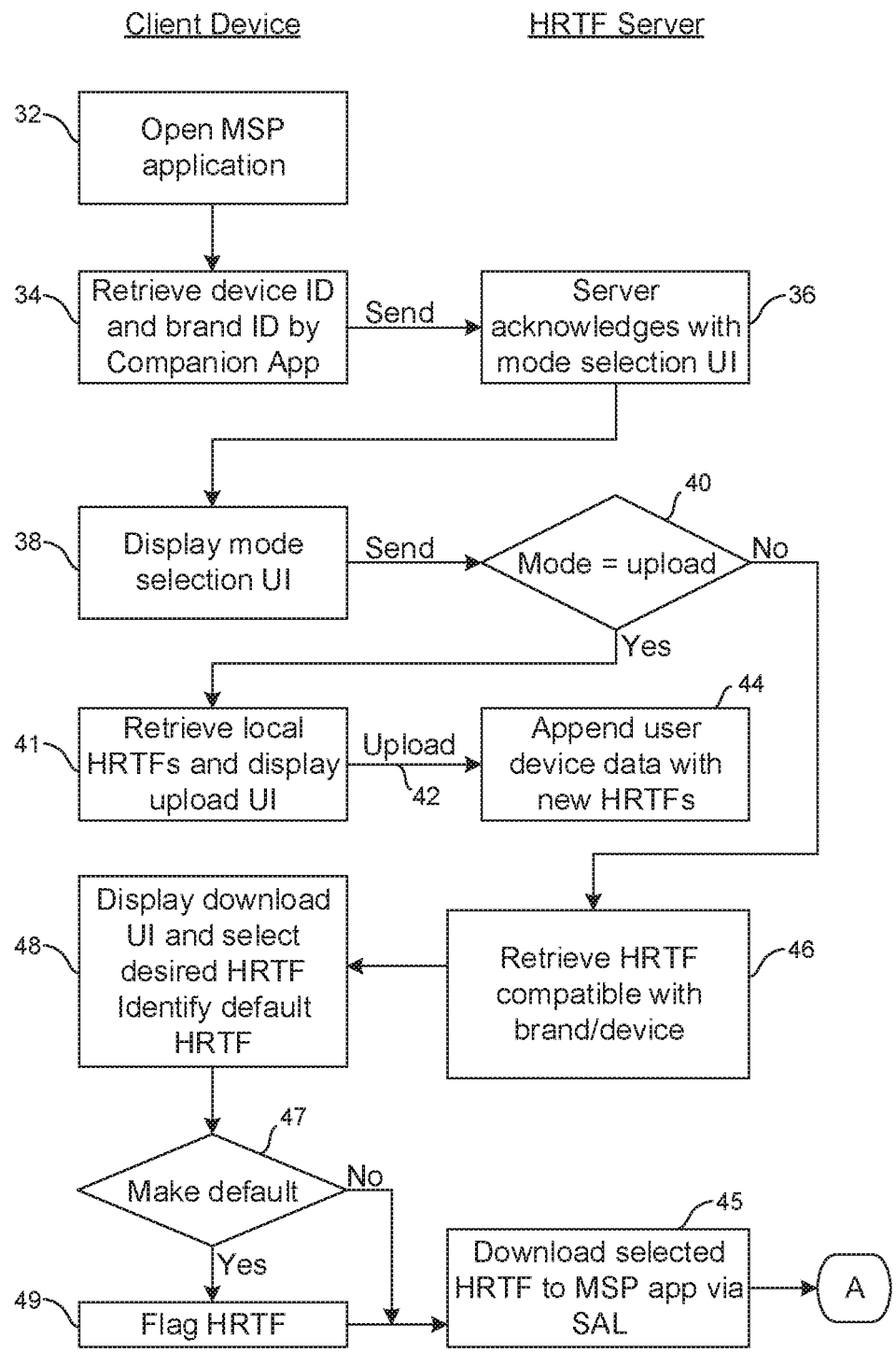
FIGS. 2A and 2B are flow diagrams of the method of an example networked HRTF repository system.

Referring now to the diagram in FIG. 2A, the process for remote storage and retrieval of HRTF data is shown in flow chart 30. Initiation of the MSP app at 32 in the client device 50 may launch companion app 89, or companion app 89 may subsequently be launched by a user action. The companion app 89 is specific for each headphone manufacturer, and all interaction between the user device and the HRTF cloud server, including managing and uploading HRTF data to the cloud server 20, is performed by the companion app. The companion app at 34 retrieves user data required for validation by the HRTF remote repository from device memory 57. Preferably, a validated user may upload and retrieve data seamlessly and anonymously without a login or a password. User related data must be sufficient to permit indexing, sorting and retrieval functions by the remote HRTF repository server and may include a unique identifier such as a phone ID, biometric data, or a combination, as well as device model and brand.

User validation data is transmitted by companion app 89 via SAL 55 and modern 54 to the HIM; remote server public API 27. If user validation is successful, the HRTF remote repository public API acknowledges a successful validation at 36 by sending a mode selection UI panel to client device 50. Alternately, the companion app 89 will generate and the mode selection UI. Client device 50 animates the mode selection panel 66 on display 56 as shown in FIG. 3A and prompts the user to make a mode selection. The mode selection UI prompts the user at 38 to select from at least one of Upload an HRTF and Download an HRTF and may optionally include additional functions such as edit a stored HRTF, or Exit. User information provided during validation may be displayed in the animated UI at 61 to allow confirmation by the user. The mode selected by the user is transmitted to the HRTF remote server.

If at 40 the selected mode is to upload locally stored HRTF data, companion app at 89 causes the processor 51 to retrieve locally stored HRTF data from client device memory 57. An animated upload UI, for example as shown in FIG. 3C, is generated either by the companion app 89 or is sent by the HRTF cloud server 20. The upload UI may be presented on display 56 to allow user selection of HRTFs to upload to HRTF remote server 20. The data associated with the selected HRTFs as well as device name/brand/model and any associated labels is uploaded via SAL 55 to remote server public API 27. The Remote server 20 appends the uploaded data to the existing user HRTF data. Device information is also appended to permit sorting the HRTF data.

If at 40 the selected mode is to download previously stored HFTR data from remote server 20, user HRTF data is retrieved at 46 from user data memory 30. Ideally only those user HRTF data profiles consistent with the intended device brand are retrieved. In addition, or alternately, generalized brand HRTF for the intended device may be retrieved from brand HRTF memory 32. In one embodiment, a generalized brand HRTF containing spatial location cues may be downloaded together with a user specific, anthropometric-based HRTF. Decoding; and subsequent convolution of the individual cues obtained from both HRTFs would provide both spatial and anthropometric cues that may be combined to provide a more complete virtualization.

A download panel UI is either generated by the companion app 89 or is sent by the HRTF cloud server 20. Names of retrieved HRTFs are transmitted to the user device 50 by the HRTF cloud server and displayed at 48 on an animated UI as in FIG. 3B to permit user selection of a desired HRTF. Ideally the current default HRTF is indicated on the UI as exemplified at 62 in FIG. 3B. An HRTF selection is made by the user with an option to make the selected HRTF the new default HRFT at 47 resulting in flagging that HRTF at 49 as the now current default HRTF. The HRTF selection is subsequently downloaded at 45 via SAL 55 to client device 50.

Figure 2B:
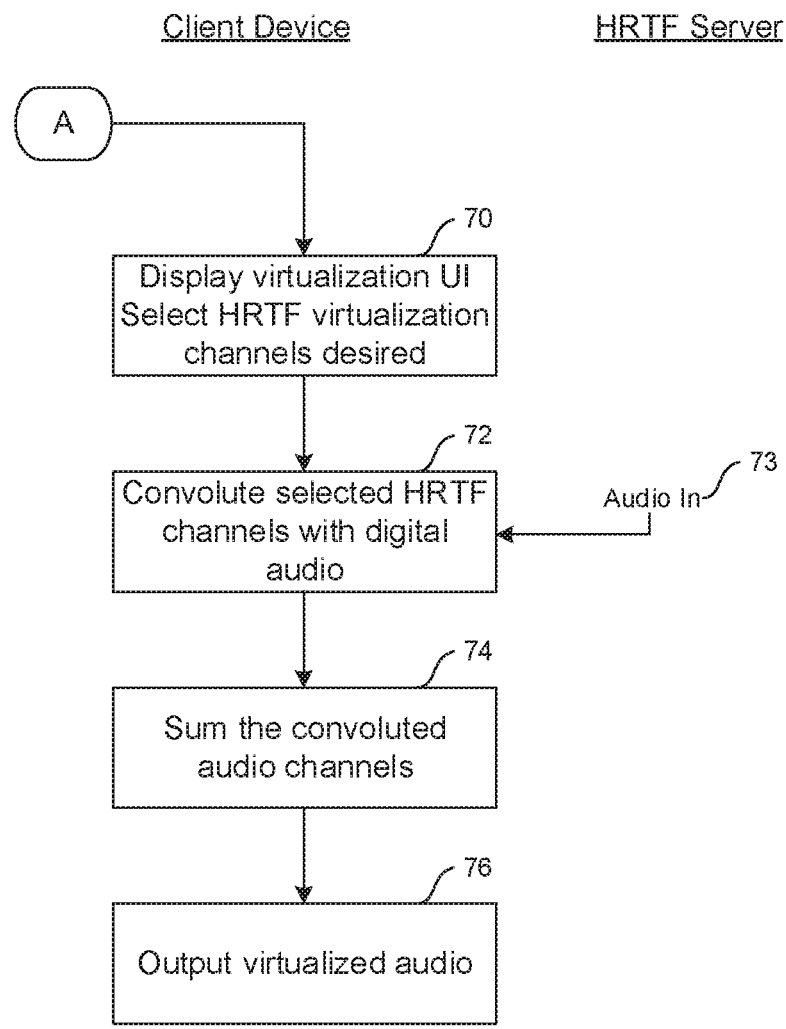

Referring now to FIG. 2B an optional Virtualization UI panel as exemplified in FIG. 3D may be presented as an animation by client device 50 on display 56. In one embodiment, the locations cues include: center (C), left front (LF), right front (RF), left, surround (LS), right surround (RS), as well as center height (CH), left front height (LFH), right front height (RFH), left surround height (LSH), right surround height (RSH), center bottom (CB), right front bottom (RFR), and left front bottom (LFB). Optionally a low frequency effects (LFE) directionality cue may be included, as well as right surround bottom (RSB), and left surround bottom (LSB), This list is presented by way of example only and it is understood that fewer or additional location cues may be included in the HRTF available for download.

The menu of location cues and pinna related cues may be included in the labels associated with the HRTF data stored in remote server memories 30 and 32. Alternately, these location cues may be determined from the location cues resulting from the decoding of the HRTF. In this embodiment, the user would select which location cues to use at 70. The related FIR or HRIR transfer functions would be subsequently convoluted at 72 with an audio stream 73. In one embodiment the resulting digital audio cues are converted from digital to analog and summed at 74. In another embodiment the digital audio cues are summed all convolution and summing is performed in the digital domain. The summation step 74 may be performed in the time domain or in the frequency domain, the latter necessitating that the summation be performed in the digital domain. The resulting virtualized audio stream containing the user specified location cues may then be provided to an audio driver and outputted at 76 to headphones, speakers, and the like.

Figure 4:
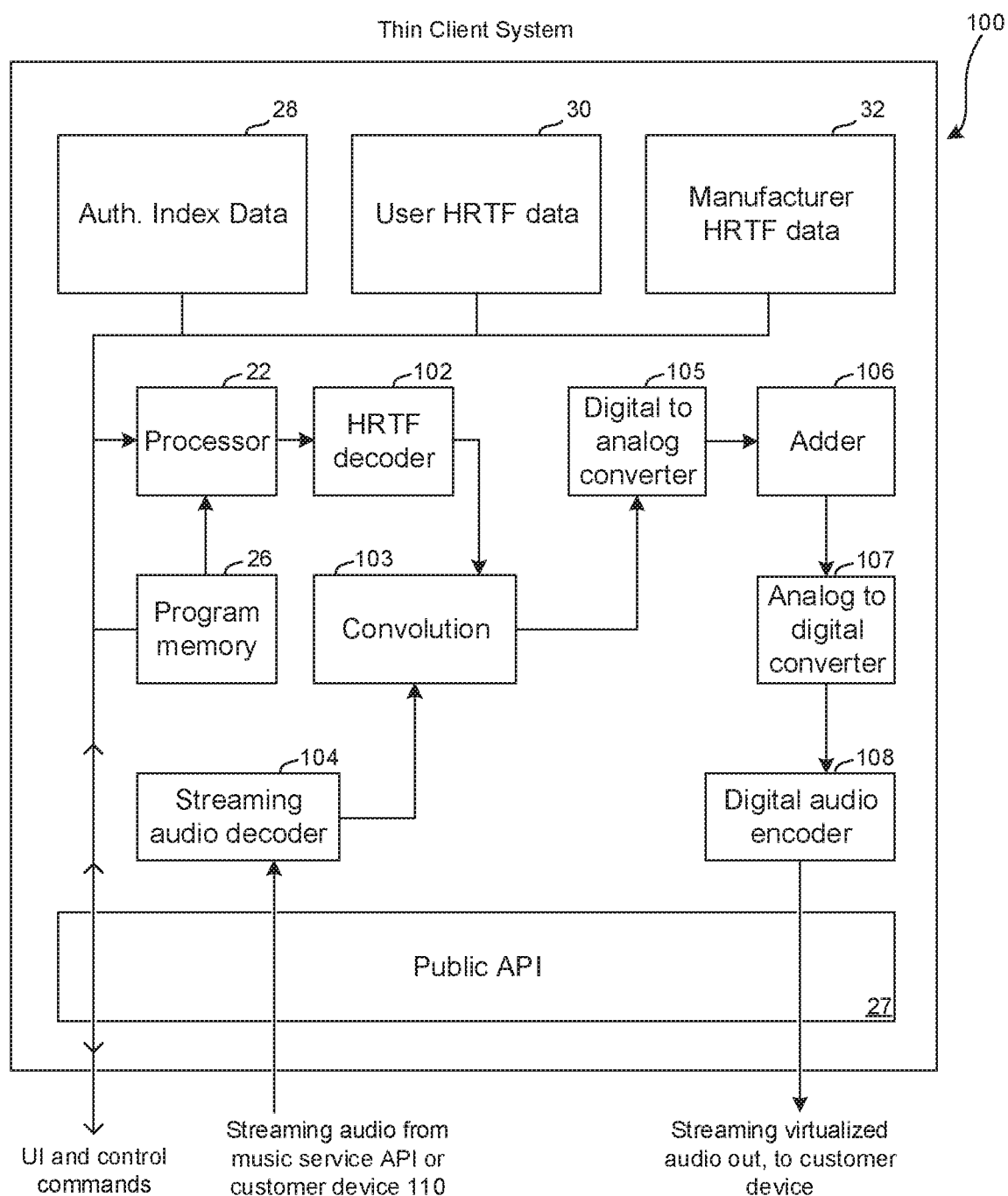
FIG. 4 is a block diagram of thin client remote server consistent with present principles.

While the above embodiments place much of the computational overhead of HRTF processing, and decoding, rendering, and virtualization processing on the processor 51 of client device 50, advantage can be taken of transferring much of the processing to the HRTF remote server. This would simplify the client device 50 thus reducing its cost. An HRTF remote server 100 capable of supporting a thin client device by assuming much of the processing overhead is shown in FIG. 4. In the embodiment shown, remote repository server 100 comprises at least one processor 22, at least one computer readable non-transitory medium comprising a program memory 26 comprising executable instructions to cause the processor to conduct HRTF storage transactions and HRTF decoding, convolution and audio virtualization processing. Also included in HRTF remote repository 100 are data memory portions for storing user validation data 28, user uploaded HRTFs 30, and generalized brand HRTF data 32. The validation memory 28 may key off a unique user/device identifier, for example a phone ID associated with a mobile phone client device. Other unique identifiers such as biometric may also be used alone or in combination with the unique phone ID. User data memory portion 30 includes user specific HRTFs and any labels that permit further sorting of the HRTF data such as user client device brand and model. Other labels may include the type, brand, and model of headphone of speaker to be used for virtualized audio output. The data memory 30 ideally supports a plurality of data sets such that a user is able to upload and store multiple profiles. In the event of multiple user HRTF data sets, a user may ideally be able to select the currently active HRTF data set to be used for audio processing.

Program memory 26 includes instructions to cause processer 22 to include HRTF decoding, HRIR/audio convolution, and virtualization functionalities. Alternate, a separate processor may be employed to execute these functions. In the embodiment shown in FIG. 4, incoming digital audio stream 110 is received via public API 27 and decoded by audio decoder 104. A user-selected HRTF is decoded by HRTF decoder 102, and the resulting HRIR transfer functions are convoluted with the digital audio stream provided by audio decoder 104 to produce individual location audio cues. In the embodiment shown, the cues are converted to analog by digital to analog converter 105, and the resulting analog location cues are summed at adder 106 to produce a virtualized audio stream. The virtualized audio stream is prepared for transmission over a network by converting the virtualized analog audio stream to digital at 107, and then encoding the digital virtualized audio stream at 108 and sending the encoded digitized virtual audio to the client device. In an alternate embodiment, all decoding, convolution, and summing are performed in the digital domain thus bypassing process blocks 105 and 107.

Figure 5:
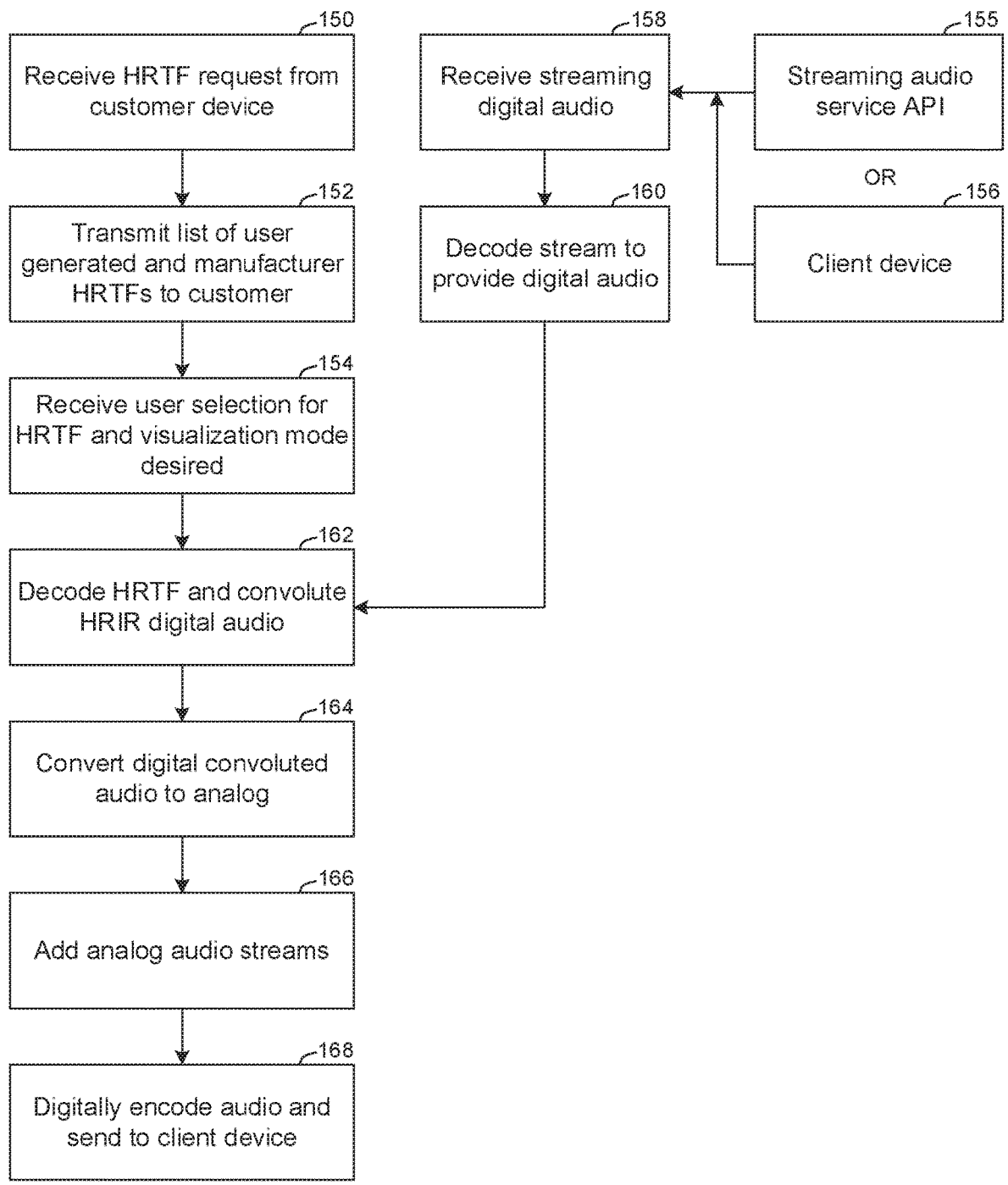
FIG. 5 is a flow chart of an example flow chart of the method of one embodiment of the thin client remote server.

FIG. 5 is a flow diagram of the HRTF remote server of the embodiment of FIG. 4. An HRTF request by the user at 150 is received by HRTF remote server 100 via SAL 55. Responsive to that request, at 152 remote server 100 transmits a list of qualifying user-generated HRTFs as well as appropriate generalized brand HRTFs to the client device. A UI panel, as exemplified in FIG. 3B, may also be sent for animation by the client device 50 processor 51 to provide a graphics UI for the user to select an HRTF from the selection received. The HRTF selected by the user is communicated to the HRTF remote server via and received at 154. Also received at 154 is an optional virtualization mode selection by the user. Streaming audio is provided by a streaming audio service 155 through its API, or alternatively through an audio file upload from client device 50. In another related embodiment, audio files may be available on the remote server 100 as a subscription service to client customers. In this event, audio files are locally available to the remote server 100. Encoded digital audio is received at 158, and decoded at 160 to provide digital audio for convolution with the FIR, or HRIR transfer functions at 162. The resulting individual digital audio location cue streams are converted to individual analog audio location cue streams at 164. These analog audio location cue streams are summed at 166 to provide a virtualized analog audio stream. The virtualized analog audio stream is encoded for digital transmission from PSP remote server 100 to client device 50. In an alternate embodiment, all HRIR convolution, summing and virtualization processes are performed in the digital domain, thus permitting these processes to be performed in either the time or the frequency domain.

Figure 6:
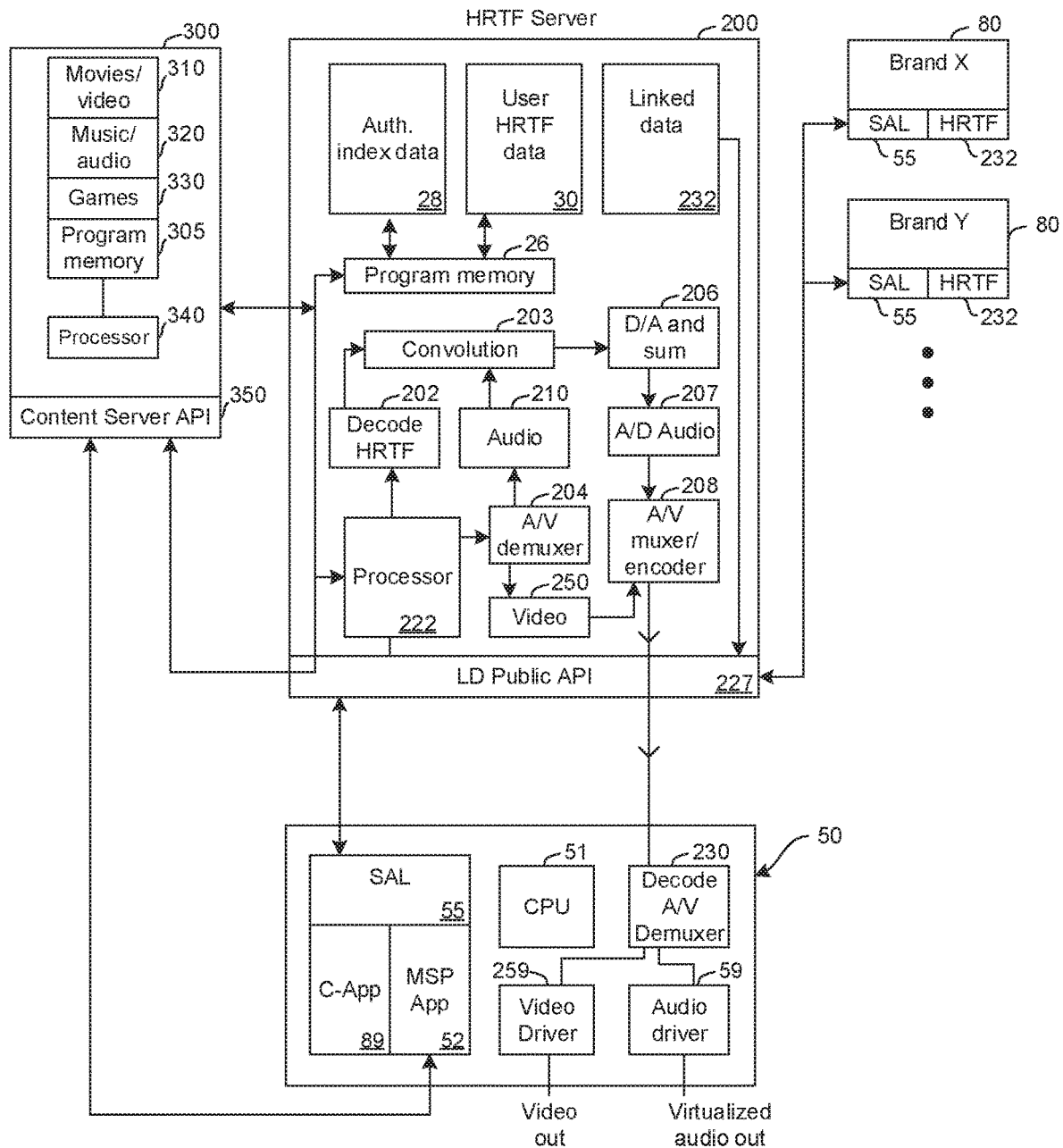
FIG. 6 is a block diagram of an MSP LD API HRTF repository system.

In yet another embodiment of a remote HRTF server, the system diagram of FIG. 6 includes a remote server 200 where the HRTF remote server's public API is a linked data (LD) API 227. This embodiment would obviate the need to store generalized brand HRTF data in the remote repository server. Rather, generalized brand HRTFs are fetched directly from the brand cloud server 80 on demand rather than being stored in the remote server in a brand HRTF data memory. Moreover, external audio sources can be fetched by the public LD API when instructed to do so. In a related embodiment, the MSP server includes audio, and video data local to the remote server and virtualization of an audio file, or virtualization of an audio soundtrack may be provided to the subscriber.

The server system of FIG. 6 includes remote HRTF repository server 200 including at least one processor 222, at least one computer readable non-transitory medium comprising a program memory 26 comprising executable instructions to cause the processor to conduct HRTF storage and retrieval transactions, and data memory portions for storing user validation data 28, user uploaded HRTFs 30, and brand server linked data 32 information for retrieval of generalized brand HRTF data from brand servers 80. The validation memory 28 may key off a unique user identifier, for example a phone ID associated with a mobile phone client device. Other unique identifiers such as biometric may also be used alone or in combination with the unique phone ID. User data memory portion 30 includes user specific HRTFs and any labels that permit further sorting of the HRTF data such as user client device brand and model. Other labels may include the type, brand, and model of headphone of speaker to be used for virtualized audio output. The data memory 30 ideally supports a plurality of data sets such that a user is able to upload and store multiple profiles. In the event of multiple user HRTF data sets, a user may be able to select from available HRTF data or from the currently active HRTF data set.

Remote server 200 further comprises a public LD API that enables remote server 200 to interface with other remote servers through their APIs. By way of example, rather than storing generalized branded HRTF data in memory in remote server 200, a request for information regarding a generalized brand HRTF, or retrieval of a generalized brand HRTF is executed by program memory 26 executing instructions to cause the processor to read at least URL information from Linked Data memory 232 and to access that brand's server API via the public LD API 227. The targeted Brand server responds by uploading the desired HRTF from its local memory or its cloud memory to the remote server 200 via the LD Public API. This embodiment facilitates the task of a brand maintaining a current data base of relevant HRTFs for its various devices in a remote server, but rather focus on keeping its own HRTF memory 232 up to date.

In another embodiment shown in FIG. 6 content server 300 comprises a computer readable non-transitory medium containing at least one of a music and audio library 310, a video/movie library 310, and a computer gaming library 330. Content server 300 further comprises a program memory 305 containing instructions executable by at least one processor 340 and a Content Server API 350 in communication with remote server LD Public API. In one embodiment, content server 300 is a subscription service for providing music, videos, and video games to client subscribers. In this embodiment, client device 50 requests virtualized audio from content server 300 by communicating that request to HRTF remote repository public LD Public API 227. The information needed by the LD API 227 to link with content server 300 may be either stored in Linked Data memory 232, or alternately provided by the client device in its request. HRTF remote server 200 sends a request to content server 300 for the content desired by the client which is then streamed to HRTF Remote Serer 200 for HRTF audio processing prior to having the processed virtualized audio redirected to the client device 50.

In a related embodiment, content server 300 may be integrated into the services provided by HRTF remote server 200. Memory in content server 300 containing a multimedia selection of audio 320, video 310 and games 330 may be directly accessible via executable instructions in the HRTF remote server program memory 26 causing processor 222 to fetch the desired multimedia content.

In another embodiment shown in FIG. 6, audio/video content or a computer game may be requested by client device. Processor 222 receives the audio/video content and separates the audio stream from the video stream at A/V demuxer 204. Ideally a timestamp for synchronizing the audio stream with the video stream is preserved to facilitate reintegration of a virtualized audio stream with the video stream. A/V demuxer 204 sends the audio portion at 210 of the video or gaming file to be convoluted at 203 with a decoded HFTR previously selected and decoded at 202.

In the embodiment shown, the resulting individual location cue streams are further processed at 206 to convert the digital location cue audio streams to analog streams. Those streams are summed at 206 to provide a virtualized audio. The virtualized analog audio is converted to a digital audio stream at 207. In an alternate embodiment, the convoluted location cue streams are kept in the digital domain and summing is performed in the digital domain. This embodiment obviates the need for D/A conversion at step 206, and A/D conversion at step 207. It further permits summing to be performed in either the time or the frequency domain.

A/V muxer at 208 combines the digital audio with the video stream to provide a digital A/V stream. Synchronizing the virtualized digital audio stream with the original video stream at 208 provides A/V content, or game content having virtualized audio. The resultant A/V content or game content is encoded for transmission over a network to client device 50 where it is decoded and processed according to known principles to provide a video signal as at 259 and virtualized audio synchronized with the video as at 59.

While the particular embodiments are herein shown and described in detail, it is to be understood that the subject matter which is encompassed by the present invent is limited only by the claims.

What is claimed is:

1. A system comprising:
   a. a computer readable non-transitory medium, said medium further comprising:
   a program memory portion further comprising an application program interface (API) module configured for receiving data items from a client device and for sending data items to a client device,
   a first data memory portion comprising client validation data representing at least one of a user-related identifier, a type of device, and
   a second data memory portion comprising head related transfer function (HRTF) data sorted according to said client validation data, and
   b. a processor in electronic communication with said computer readable non-transitory medium configured to receive request for a client HRTF, the request comprising client validation data, the API to cause the processor to:
   compare the client validation data received in the request with the client validation data stored in the first data memory portion, and responsive to validating that the client validation data received in the request matches the client validation data stored in the first memory portion:
   send a selection prompt to the client device, wherein API executed by the processor is to cause at least one user interface (UI) to be presented at the client device to generate transfer mode selection data, the UI comprising a perceptible prompt to select at least one of retrieve HRTF data, upload HRTF data, specify a virtual audio mode, or cancel the transaction, and the at least one UI comprising three or more of location cues for identifying the client HRTF, the three or more location cues comprising three of more of center (C), left front (LF), right front (RF), left surround (LS), right surround (RS), center height (CH), left front height (LFH), right front height (RFH), left surround height (LSH), right surround height (RSH), center bottom (CB), right front bottom (RFB), left front bottom (LFB) low frequency effects (LFE) right surround bottom (RSB), and left surround bottom (LSB);
   receive the transfer mode selection data and location cues from the client device; and
   responsive to receiving from the client device a request for audio content, cause the API to receive audio content from an audio source, such that the audio content can be convoluted with the client HRTF to provide virtualized audio to the client device in accordance with the selected location cues.

2. The system of claim 1 further comprising wherein the processor is configured to cause the API responsive to receiving transfer mode selection data requesting upload of client HRTF to send an HRTF upload UI prompting user selection of locally stored HRTF data to be uploaded to the API from the client device, and
   responsive to receiving transfer mode selection data requesting retrieve HRTF data to send an HRTF download UI prompting the user to select selection an HRTF stored in said second data memory portion to be downloaded to the client device from said second memory portion.

3. The system of claim 2 wherein the API is a linked data API, and said second data memory portion further comprises a user HRTF data portion wherein HRTF data is provided by individual users and indexed by individual user identifiers, and a manufacturer data portion comprising linked data API validation data whereby the linked data API retrieves a manufacturer provided brand specific HRTF from a brand manufacturer server responsive to a user request for a brand manufacturer-provided HRTF.

4. The system of claim 3 further comprising a data memory portion for audio source content linked data information whereby said processor causes said linked data API to retrieve audio content from an audio source content server and wherein said program memory further comprises a HRTF decoding and convolution program for decoding a selected HRTF, convoluting the decoded HRTF with the audio content to provide virtualized audio in accordance with a selected virtual audio mode.

5. The system of claim 3 wherein the processor combines user head-related impulse response (HRIR) pinna and inner ear anthropometric related transfer functions with a generalized brand HRIR transfer functions for convolution with the audio content data to generate a combined virtualized audio stream.

6. The system of claim 3 wherein the processor re-synchronizes the virtualized audio stream with an associated video to generate a video content having virtualized audio.

7. The system of claim 2 wherein the second data memory portion further comprises a user HRTF data portion wherein HRTF data is provided by individual users and indexed by individual user identifiers, and a manufacturer HRTF data portion wherein HRTF data is provided by device brand manufacturers and is indexed by manufacturer brand identifiers.

8. The system of claim 1 wherein the API is adapted to send the UI to the client device prompting the user of the client device to select a desired virtual audio mode to be generated by an HRTF decoding and convolution program.

9. A method, comprising:
   executing an application program module in a client device, the application program module configured to upload and download head-related transfer functions (HRTFs) related to the specific client device, at least in part by:
   initiating execution of the application program module causing the application program module to send validation data comprising at least one of a user-related identifier and a type of device to an API on a remote server and responsive to a successful validation,
   receiving from the remote server a transfer mode selection UI and presenting said transfer mode UI on a display;
   animating execution of the transfer mode selection UI received from the remote server API by:
   causing the application program module to prompt the client device user to select from one of uploading HRTF data, downloading HRTF data, specify a desired virtualization mode, cancelling the transfer;
   causing a virtualization user interface (UI) to be presented on the client device, the virtualization UI comprising three or more of location cues for identifying a HRTF, the three or more location cues comprising three of more of center (C), left front (LF), right front (RF), left surround (LS), right surround (RS), center height (CH), left front height (LFH), right front height (RFH), left surround height (LSH), right surround height (RSH), center bottom (CB), right front bottom (RFB), left front bottom (LFB) low frequency effects (LFE) right surround bottom (RSB), and left surround bottom (LSB);
   responsive to selection of the location cues by the client device user, sending by the application program module, at least the location cues to the remote server API; and responsive to a request from the client device to receive audio content, causing the application program module to provide virtualized audio received from the remote server API in accordance with the selected HRTF and the selected location cues.

10. The method as in claim 9, further comprising:
animating execution of the HRTF selection UI received from the remote server API by causing the application program module to prompt the user of the client device to select one of selecting locally stored HRTFs for uploading, and selecting compatible HRTFs in said second data memory portion of the remote server for downloading to generate HRTF selection data and causing the application program module to send the HRTF selection data to the remote server API; and
animating execution of the virtualization UI received from the remote server API for presentation on a display, by prompting the user of the client device to select a desired virtualization to generate virtualization mode selection data, and sending the virtualization mode selection data to the remote server API.

11. A device comprising:
at least one processor configured with instructions executable to:
provide user validation information comprising at least one of a user identifier and a type of device to a remote server API over a network,
present on at least one client device at least one virtualization user interface (UI), the virtualization UI comprising three or more of location cues for identifying a HRTF, the three or more location cues comprising three of more of center (C), left front (LF), right front (RF), left surround (LS), right surround (RS), center height (CH), left front height (LFH), right front height (RFH), left surround height (LSH), right surround height (RSH), center bottom (CB), right front bottom (RFB), left front bottom (LFB) low frequency effects (LFE) right surround bottom (RSB), and left surround bottom (LSB);
identify at least one head-related transfer function (HRTF) according to selection from the virtualization UI, the at least one HRTF comprising one or more of user-related HRTF data, generalized brand HRTF data;
provide location cues selected from the virtualization UI to the remote server API; and
play audio on at least one speaker using at least one HRTF, wherein the audio is convoluted using the at least one HRTF and is played in accordance with the location cues data.

12. A device as in claim 11 wherein the instructions are executable to:
a. decode at least one HRTF to provide an HRIR head-related impulse response (HRIR) transfer function,
b. convolute at least one HRIR with audio data to generate rendered localization cues, and
c. sum the rendered localization cues to generate virtualized audio data.

13. A device as in claim 12 wherein the instructions are downloadable to a consumer electronic device.

14. A system device as in claim 13 further comprising a computer medium that is not a transitory signal that comprises a Server Access Library, and said Server Access Library enabling network communication between said networked consumer electronic device and public API to create a publicly accessible repository of HRTF data.

15. A device as in claim 12 wherein the system comprises a networked consumer electronic device.

16. The device of claim 11, wherein the instructions are executable to:
i. initiate networked communication with a remote server API,
ii. provide user validation information to said remote server API,
iii. display a UI to prompt a user to select an HRTF transfer mode,
iv. provide instruction to the remote server API for uploading user generated HRTF data, and for downloading at least one of user generated HRTF data and generalized brand HRTF data, and
v. display a UI to prompt the user to select a virtualization mode.

* * * * *